United States Patent
Lee et al.

(10) Patent No.: US 8,658,975 B2
(45) Date of Patent: *Feb. 25, 2014

(54) IMAGE SENSOR FOR MEASURING ILLUMINATION, PROXIMITY AND COLOR TEMPERATURE

(75) Inventors: Byoung-Su Lee, Yeosu-si (KR); Chan-Ki Kim, Seoul (KR); Young-Ho Seo, Gunpo-si (KR)

(73) Assignee: Siliconfile Technologies Inc., Seoul (KR)

( * ) Notice: Subject to any disclaimer, the term of this patent is extended or adjusted under 35 U.S.C. 154(b) by 607 days.

This patent is subject to a terminal disclaimer.

(21) Appl. No.: 12/793,066

(22) Filed: Jun. 3, 2010

(65) Prior Publication Data

US 2010/0314543 A1 Dec. 16, 2010

(30) Foreign Application Priority Data

Jun. 10, 2009 (KR) .................. 10-2009-0051639

(51) Int. Cl.
*G02F 1/01* (2006.01)
*H01L 31/00* (2006.01)

(52) U.S. Cl.
USPC ........................................... 250/330

(58) Field of Classification Search
USPC ............ 250/330, 332, 338.1, 339.01–339.06, 250/339.11, 341.8, 226, 208.1; 356/402, 356/416, 419, 425, 435; 348/222.1, 223.1, 348/224.1, 225.1, 272, 273, 276–280
See application file for complete search history.

(56) References Cited

U.S. PATENT DOCUMENTS

| | | | | |
|---|---|---|---|---|
| 5,555,464 A | * | 9/1996 | Hatlestad | 348/266 |
| 5,644,385 A | * | 7/1997 | Mizuno | 356/3.04 |
| 6,770,861 B2 | * | 8/2004 | Hagihara | 250/208.1 |
| 7,050,089 B2 | * | 5/2006 | Nakamura | 348/148 |
| 7,235,775 B2 | * | 6/2007 | Masaki | 250/226 |
| 7,375,803 B1 | * | 5/2008 | Bamji | 356/4.01 |
| 7,560,679 B1 | * | 7/2009 | Gutierrez | 250/208.1 |
| 7,965,336 B2 | * | 6/2011 | Bingle et al. | 348/374 |
| 2003/0030730 A1 | * | 2/2003 | Nakayama | 348/223.1 |
| 2004/0169748 A1 | * | 9/2004 | Acharya | 348/279 |
| 2005/0151053 A1 | | 7/2005 | Griffin et al. | |
| 2008/0122927 A1 | * | 5/2008 | Konno et al. | 348/143 |
| 2010/0200752 A1 | * | 8/2010 | Lee et al. | 250/330 |
| 2012/0176533 A1 | * | 7/2012 | Cellier et al. | 348/362 |

FOREIGN PATENT DOCUMENTS

| | | | |
|---|---|---|---|
| EP | 1133168 A2 | * | 9/2001 |
| JP | 63-024765 A | | 2/1988 |
| JP | 02015793 A | * | 1/1990 |
| JP | 10-108206 A | | 4/1998 |

(Continued)

*Primary Examiner* — Michael G Lee
*Assistant Examiner* — Suezu Ellis
(74) *Attorney, Agent, or Firm* — Kile Park Reed & Houtteman PLLC

(57) ABSTRACT

Disclosed is an image sensor for measuring illumination, proximity and color temperature, including: a light source unit configured to irradiate infrared with a wavelength of a specific band onto an object; a light source controller configured to control power supplied to the light source unit; an infrared transmission filter configured to allow only the infrared and visible ray with the wavelength of the specific band among light incident through a lens after being reflected by the object to selectively transmit therethrough; a first sensing unit provided with an image pixel for acquiring an image of the object introduced through the infrared transmission filter; and a second sensing unit configured to receive the infrared and the visible ray having passed through the infrared transmission filter and measure current illumination, proximity to the object and color temperature of the object.

7 Claims, 3 Drawing Sheets

(56) References Cited

FOREIGN PATENT DOCUMENTS

| JP | 11-155105 A | 6/1999 |
| JP | 2003-101867 A | 4/2003 |
| WO | 2009/051363 A2 | 4/2009 |

\* cited by examiner

IMAGE SENSOR FOR MEASURING ILLUMINATION, PROXIMITY AND COLOR TEMPERATURE

BACKGROUND OF THE INVENTION

1. Field of the Invention

The present invention relates to an image sensor, and more particularly, to an image sensor capable of measuring illumination, proximity and color temperature, which can measure current illumination, proximity to an object and color temperature of the object by using variation of an output voltage value according to the existence or absence of infrared and visible ray with a wavelength of a specific band.

2. Description of the Related Art

In general, an image sensor using a charge-coupled device (CCD) or a complementary metal-oxide semiconductor (CMOS) has an absorption band of 40 nm to 1100 nm. Furthermore, visible ray normally has a wavelength of 380 nm to 650 nm and infrared has a wavelength of 650 nm to 1100 nm. It is general that such an image sensor uses an infrared (IR) cut-off filter, which allows light with a wavelength of 650 nm or less to pass therethrough and cuts off light (i.e., infrared) with a wavelength of 650 nm or more, in order to detect and display colors the same as those perceived by the human eye.

According to the prior art, light in an infrared area is used as a light source in order to acquire an image by photographing an environment (e.g., a monitoring camera) with less external light, that is, a night environment, a sealed space after an electric light is turned off and the like, by using such an image sensor. In order to use the light in the infrared area as the light source according to an external environment as described above, when light from an external light source is sufficient, the light in the infrared area is cut off by the IR cut-off filter to improve image quality. When the light in the infrared area is used as the light source for lack of the light from the external light source, the IR cut-off filter is not used to allow the light in the infrared area to reach the image sensor.

Therefore, a moving unit capable of changing the position of the IR cut-off filter according to the existence or absence of the external light source is essentially required for a system using the image sensor. Installation of the moving unit that mechanically moves the IR cut-off filter may increase the size and manufacturing cost of a monitoring camera and the like.

Furthermore, an infrared light emitting diode used for a conventional image sensor has been generally limited only to a function as a light source for acquiring an image in a dark environment.

Recently, there are increased demands for a proximity function capable of automatically controlling a mobile apparatus according to the distance between a user and the mobile apparatus in the case of using the mobile apparatus such as a digital camera or a cell phone, and an electronic apparatus. In this regard, when the distance between the user and the mobile apparatus is measured and the user is located near the mobile apparatus based on the distance information, the proximity function has been proposed to reduce power consumption by automatically cutting off power supplied to a backlight unit (BLU) provided in a liquid crystal window, or to prevent an abnormal operation by automatically stopping the operation of a touch sensor.

In order to realize such a proximity function according to the related art, a proximity sensor separately manufactured using a light emitting diode (LED) and a light receiving element has been installed in a mobile apparatus, an electronic apparatus and the like for use.

However, when the separate proximity sensor is installed as described above, the size of the mobile apparatus, the electronic apparatus and the like is increased, resulting in going against the recent technology trend toward performance of a plurality of functions through miniaturization of products, and an increase in the manufacturing cost for installing the separate proximity sensor.

Moreover, an entire image pixel is required to measure the color sense or color temperature of an object, resulting in an increase in power consumption.

SUMMARY OF THE INVENTION

Accordingly, the present invention has been made in an effort to solve the problems occurring in the related art, and an object of the present invention is to provide an image sensor capable of measuring illumination, proximity and color temperature, which includes a separate second sensing unit having an illumination detector, a proximity detector and a color temperature detector provided in the vicinity of a first sensing unit having an image pixel in a system such as a camera provided with an image sensor, and can measure current illumination, proximity to an object and color temperature of the object based on variation of an output voltage value from the second sensing unit according to the existence or absence of infrared and visible ray with a wavelength of a specific band.

In order to achieve the above object, according to one aspect of the present invention, there is provided an image sensor for measuring illumination, proximity and color temperature, including: a light source unit configured to irradiate infrared with a wavelength of a specific band onto an object; a light source controller configured to control power supplied to the light source unit; an infrared transmission filter configured to allow only the infrared and visible ray with the wavelength of the specific band among light incident through a lens after being reflected by the object to selectively transmit therethrough; a first sensing unit provided with an image pixel for acquiring an image of the object introduced through the infrared transmission filter; and a second sensing unit configured to receive the infrared and the visible ray having passed through the infrared transmission filter and measure current illumination, proximity to the object and color temperature of the object.

The image sensor capable of measuring illumination, proximity and color temperature in accordance with an embodiment of the present invention includes the separate second sensing unit provided in the vicinity of the first sensing unit having the image pixel while operating separately from the first sensing unit, thereby facilitating measurement of current illumination, proximity to an object and color temperature of the object while reducing power consumption.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings.

Figure 1:
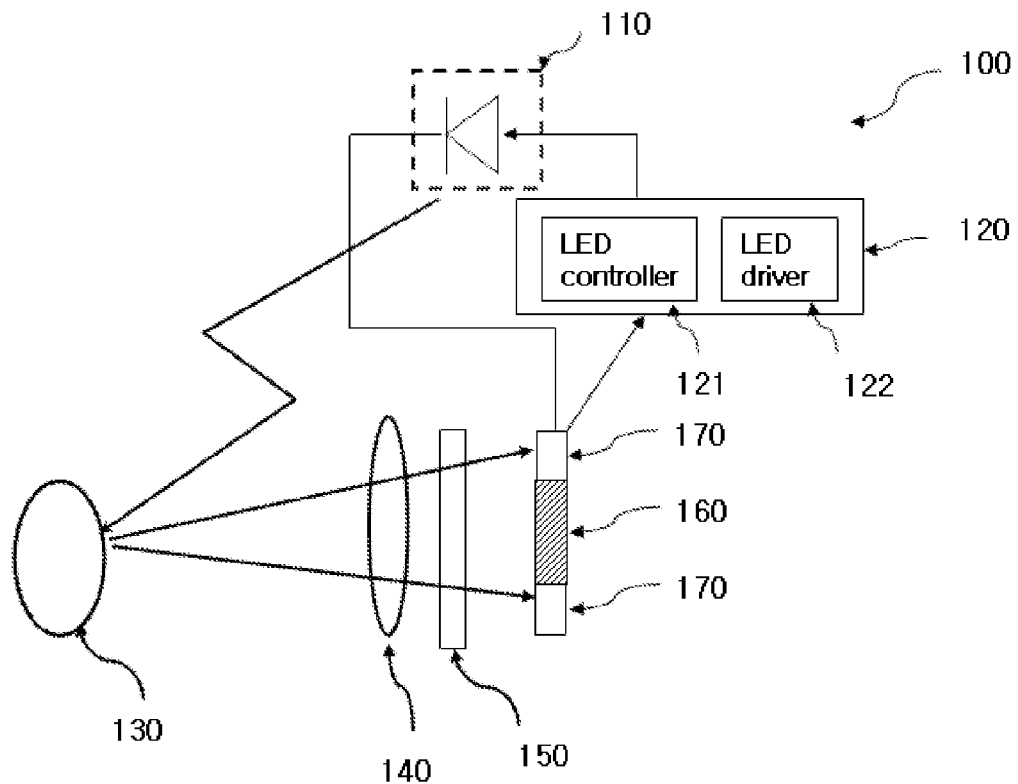
FIG. 1 is a diagram illustrating of the configuration of an image sensor capable of measuring illumination, proximity and color temperature in accordance with an embodiment of the present invention.

FIG. 1 is a diagram illustrating of the configuration of an image sensor capable of measuring illumination, proximity and color temperature in accordance with an embodiment of the present invention.

Referring to FIG. 1, the image sensor 100 capable of measuring the illumination, proximity and color temperature in accordance with the embodiment of the present invention includes a light source unit 110, a light source controller 120, an infrared transmission filter 150, a first sensing unit 160 and a second sensing unit 170.

The light source unit 110 irradiates infrared with a wavelength of a specific band onto an object 130. The light source unit 110 may include an infrared light emitting diode (LED) that irradiates infrared with a wavelength of 850 nm onto the object 130.

The light source controller 120 includes an LED controller 121 that generates a control signal for controlling on/off of the light source unit 110, and an LED driver 122 that controls power supplied to the light source unit 110 based on the control signal.

The infrared transmission filter 150 allows only infrared and visible ray with a wavelength of a specific band among light introduced through a lens 140 after being reflected by the object 130 to selectively transmit therethrough.

The first sensing unit 160 includes an image pixel to acquire an image of the object 130 introduced through the infrared transmission filter 150.

The second sensing unit 170 receives the infrared and visible ray with the wavelength of the specific band, which have passed through the infrared transmission filter 150, and measures current illumination, proximity to the object 130 and color temperature of the object 130.

Figure 2:
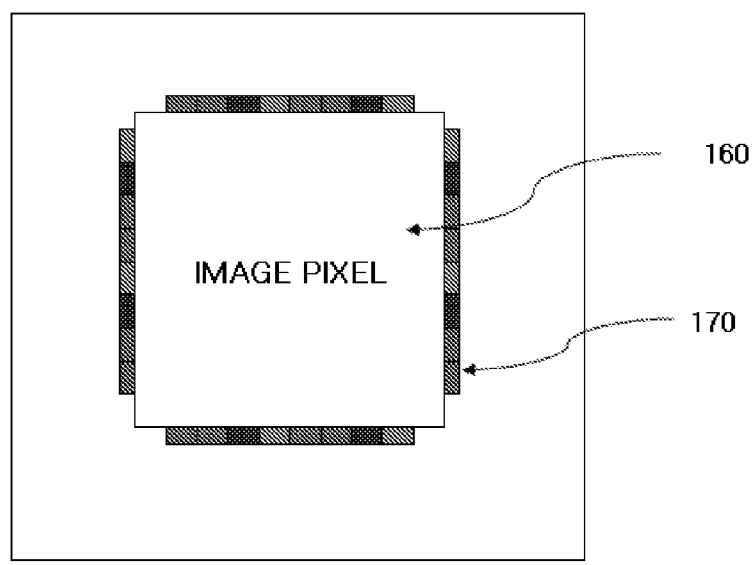
FIG. 2 is a diagram illustrating a state in which a second sensing unit is provided in the vicinity of a first sensing unit in accordance with an embodiment of the present invention.

FIG. 2 is a diagram illustrating a state in which the second sensing unit is provided in the vicinity of the first sensing unit in accordance with the embodiment of the present invention.

As shown in FIG. 2, the second sensing unit 170 is separately provided in the vicinity of the first sensing unit 160 while independently operating without a connection to the image pixel of the first sensing unit 160.

Figure 3:
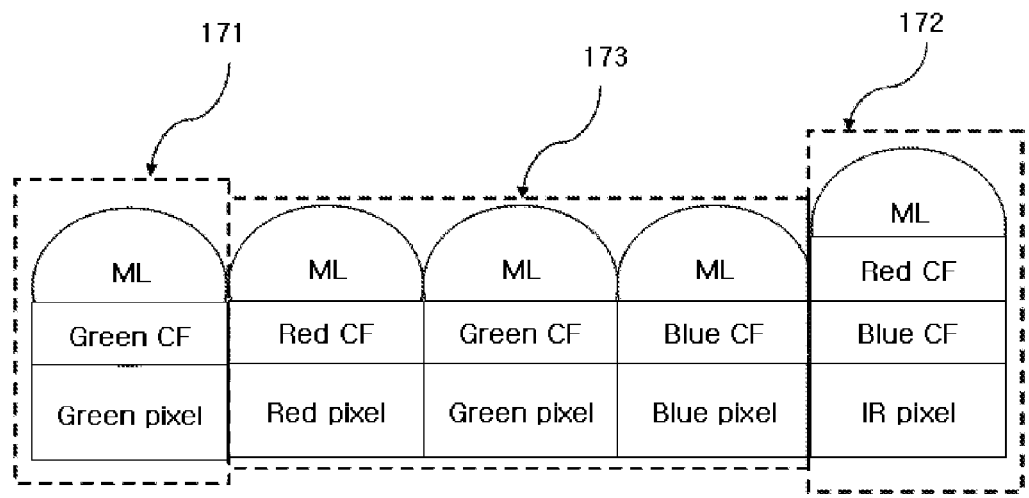
FIG. 3 is a detailed diagram illustrating of the configuration of a second sensing unit shown in FIG. 2.

FIG. 3 is a detailed diagram illustrating of the configuration of the second sensing unit shown in FIG. 2.

As shown in FIG. 3, the second sensing unit 170 includes an illumination detector 171, a proximity detector 172 and a color temperature detector 173.

The illumination detector 171 receives the infrared and visible ray with the wavelength of the specific band, which have passed through the infrared transmission filter 150, and measures the current illumination.

The proximity detector 172 receives the infrared with the wavelength of the specific band, which has passed through the infrared transmission filter 150, and measures proximity to the object 130 based on a difference between output voltages according to the on/off of the light source unit 110.

The color temperature detector 173 generates an output voltage based on the visible ray with the wavelength of the specific band, which has passed through the infrared transmission filter 150, and measures color temperature of the object 130.

As shown in FIGS. 2 and 3, the illumination detector 171 may be provided in a plural number throughout the second sensing unit 170 in order to easily measure the brightness of light introduced from the exterior of the lens 140. The proximity detector 172 for determining the proximity to the object 130 and the color temperature detector 173 may also be provided in a plural number throughout the second sensing unit 170, similarly to the illumination detector 171.

Meanwhile, FIG. 3 shows the case in which a separate green pixel is used as the illumination detector 171. However, it is possible to measure the current illumination by using a green pixel provided in the color temperature detector 173, instead of the separate green pixel.

Herein, the illumination detector 171 detects the brightness of the external light incident into the second sensing unit 170 after being reflected by the object 130 and passing through the lens 140. In general, the illumination detector 171 is designed to have a spectrum the same as a brightness curve perceived by the human eye. Furthermore, the illumination detector 171 is provided in a plural number at an outside of the first sensing unit 160 including the image pixel while being adjacent thereto, so that an average of light reflected by the object 130 and thus the current illumination due to the external light can be relatively accurately measured from the average of the light.

Preferably, the proximity detector 172 includes an infrared (IR) pixel and further includes a blue (B) color filter and a red (R) color filter on the IR pixel. Furthermore, the proximity detector 172 generates output voltage values based on the infrared with the wavelength of the specific band, which is introduced into the lens 140 after being irradiated from the light source unit 140 and reflected by the object 130.

Moreover, the blue (B) color filter and the red (R) color filter installed on the IR pixel of the proximity detector 172 serves as a visible ray cut-off filter that cuts off visible ray introduced after transmitting through the lens 140. As described above, the visible ray cut-off filter is provided on the infrared (IR) pixel of the proximity detector 172, so that the visible ray is prevented from reaching the proximity detector 172, and a difference between the output voltage values caused by only the infrared with the wavelength of the specific band, which is reflected by the object 130, is calculated, resulting in the improvement of the accuracy of proximity determination.

The color temperature detector 173 includes a red (R) pixel, a green (G) pixel and a blue (B) pixel, detects an output voltage based on the visible ray with the wavelength of the specific band, which has passed through the infrared transmission filter 150, and measures the color temperature of the object 130. Furthermore, a red (R) color filter, a green (G) color filter and a blue (B) color filter may be provided on the red (R) pixel, the green (G) pixel and the blue (B) pixel, respectively.

In detail, the red (R) pixel, the green (G) pixel and the blue (B) pixel are installed separately from an area in which the image pixel of the first sensing unit 160 is installed, and operate separately from the image pixel of the first sensing unit 160. Consequently, when measuring the color temperature of the object 130, R, G and B pixels provided in the color temperature detector 173 are used without directly using an image pixel causing high power consumption, so that the color temperature of the object 130 can be easily measured while reducing power consumption.

Figure 4:
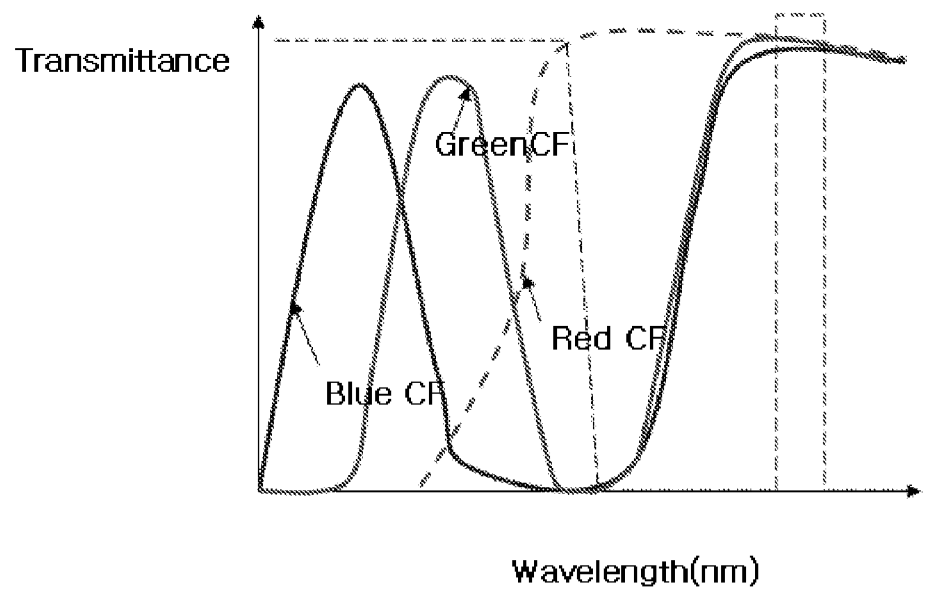
FIG. 4 is a graph illustrating transmittance of an IR transmittance filter in accordance with an embodiment of the present invention.

FIG. 4 is a graph illustrating transmittance of the IR transmittance filter in accordance with the embodiment of the present invention.

Referring to FIG. 4, it can be understood that the IR transmittance filter allows light with a wavelength of 400 nm to 650 nm (a visible ray area) in order to acquire an image, cuts off light in an infrared area which degrades color characteristics, and allows only infrared with a specific wavelength of 850 nm band, which serves as a light source for determining the proximity of an object or a light source as an illumination for measuring the color temperature thereof, to transmit therethrough.

As described above, only the wavelength of the visible ray area and the wavelength of the specific band in the discontinuous infrared area are transmitted by the IR transmittance filter, so that degradation of color characteristics can be minimized, and the infrared LED can be utilized as a light source for the proximity determination and color temperature measurement of the object as well as a simple light source.

Figure 5:
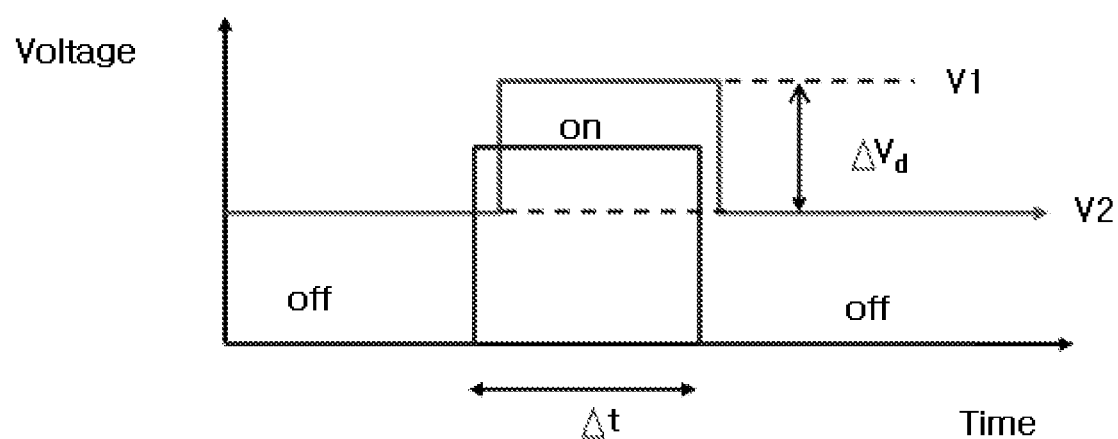
FIG. 5 is a graph illustrating determination of proximity to an object by using variation of an output voltage from a proximity detector in accordance with an embodiment of the present invention.

FIG. 5 is a graph illustrating determination of the proximity to the object by using variation of an output voltage from the proximity detector in accordance with the embodiment of the present invention.

Referring to FIG. 5, V1 denotes an output voltage value measured by the proximity detector 172 based on the light introduced through the lens when the light source unit 110 irradiating infrared with the wavelength of 850 nm band is turned on, V2 denotes an output voltage value output from the proximity detector 172 when the light source unit 110 is turned off, and ΔVd denotes the difference between V1 and V2.

The intensity of the light incident into the proximity detector 172 after being reflected by the object 130 when the light source unit 110 is turned off is determined only by the intensity of external light. However, the intensity of the light incident into the proximity detector 172 after being reflected by the object 130 when the light source unit 110 is turned on is determined by the sum of the intensity of the external light and the intensity of the light emitted from the light source unit 110.

Accordingly, the difference between the output value V2 from the proximity detector 172 when the light source unit 110 is in the turned off state and the output value V1 from the proximity detector 172 when the light source unit 110 is in the turned on state is determined only by the relationship between the light emitted from the light source unit 110 and the object, regardless of the external light. Furthermore, the ΔVd value depends on the distance between the object 130 and the light source unit 110.

That is, when the same object is far from the light source unit 110, the amount of the light incident into the proximity detector 172 after being emitted from the light source unit 110 and reflected by the object is extremely small. However, when the object gradually approaches the light source unit 110, the amount of the light incident into the proximity detector 172 after being emitted from the light source unit 110 and reflected by the object is increased, and thus the ΔVd value is increased.

Accordingly, when the ΔVd value is large, the proximity detector 172 determines that the object approaches the light source unit 110 since a large amount of the infrared emitted from the light source unit 110 is introduced after being reflected by the object. However, when the ΔVd value is small, the proximity detector 172 determines that the object is far from the light source unit 110 since a small amount of the infrared emitted from the light source unit 110 is introduced after being reflected by the object.

That is, since the ΔVd value is proportional to the reflectivity R of the object while being inverse proportional to the square of the distance d between the proximity detector 172 and the object, when the distance d is very large (long distance), the output value from the proximity detector 172 shows less difference between when the light source unit 110 is in the turned on state and when the light source unit 110 is in the turned off state. However, the distance d is small (proximity distance), the output value from the proximity detector 172 shows significant difference between when the light source unit 110 is in the turned on state and when the light source unit 110 is in the turned off state. Accordingly, the difference ΔVd between the output values is calculated, so that the distance d to the object can be accurately calculated.

Actually, the turn-on time interval Δt of the light source unit 110 may be repeated three or five times at a time of 0.1 sec or less in order to calculate the distance d to the object more accurately.

As described above, by the use of both the LED irradiating the light with the wavelength of the specific band (e.g., 850 nm) and the IR transmittance filter allowing the light of the specific band introduced into the lens after being irradiated from the light source and reflected by the object, variation of the output voltage values from the proximity detector 172 is calculated according to the existence or absence of the light of the specific band, so that the proximity to the object can be easily determined.

Moreover, for the illumination measurement, the proximity determination of the object and the color temperature measurement of the object, respective light sources are not separately provided and the single LED is used, so that the illumination measurement, the proximity determination and the color temperature measurement can be easily realized while preventing an increase in the size of the system using the image sensor.

In the case in which the light source unit 110 is formed of the infrared LED irradiating the infrared with the wavelength of 850 nm band, when the light source unit 110 is turned on for illumination when photographing at night or for the proximity determination and the color temperature measurement, persons do not feel dazzling and has difficulty in recognizing flicker of the infrared LED. However, since the sensitivity of the sensor detecting the light reflected by the object is increased, more accurate images can be achieved and the proximity and color temperature measurement can be performed more accurately.

Furthermore, the infrared of 850 nm band is used as a light source and infrared except for 850 nm band is cut off by the IR transmission filter, so that the degradation of color characteristics can be minimized. That is, when using the IR transmission filter as a light source when photographing at night or a light source for the proximity determination and the color temperature measurement, the IR transmission filter serves as a transmission filter that allows the infrared of 850 nm band to transmit therethrough. However, when photographing in the daytime, the IR transmission filter serves as an infrared cut-off filter that cuts off infrared with wavelengths of bands except for 850 nm band. As a result, the degradation of color characteristics can be minimized.

In this regard, in the case of using the LED as a light source when photographing at night, the LED controller 121 may generate a turn-on signal for the LED based on an external control signal in order to acquire images. In the case of using the LED as a light source for the proximity determination and the color temperature measurement, the LED controller 121 may generate a control signal for allowing turn-on and turn-off of the LED to be repeated in plural times for a predetermined time.

According to the embodiment, a control signal for the proximity determination and the color temperature measurement may be generated to allow the turn-on and turn-off of the LED to be repeated about three to five times while the turn-on time of the LED is maintained at 0.1 second or less. Consequently, the difference between output voltage values from the sensor unit can be measured more quickly and accurately according to the existence or absence of the light irradiated from the LED.

Furthermore, when acquiring images in a night mode in which an external light source is weak, the image of the object 130 is acquired by using the light irradiated from the LED as a light source.

At this time, the night mode can be selected when the brightness of the LED in the turned off state is lower than a reference value. Accordingly, when the brightness of an image is very low during the operation of the image sensor, that is, when the night mode is selected since the intensity of the light incident into the illumination detector 171 provided in the second sensing unit 170 is low, the LED is used as a light source by turning on the LED. As described above, in the case of using the LED as a light source when photographing at night, the LED may be selected to have a wavelength of an appropriate band enough to prevent persons from feeling dazzling according to the curve of sensitivity versus wavelengths of the image sensor.

The embodiment describes an example in which the light source unit 110 is formed of the infrared LED that irradiates the infrared with the wavelength of 850 nm. However, the wavelength of the specific band of the light irradiated from the LED is not limited thereto. For example, various wavelengths may be selected according to the characteristics of the infrared transmission filter.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. An image sensor for measuring illumination, proximity and color temperature, the image sensor consisting essentially of:
    a light source unit configured to irradiate infrared light with a wavelength of a specific band onto an object;
    a light source controller configured to control power supplied to the light source unit;
    a lens for passing light reflected by the object therethrough;
    an infrared transmission filter configured to allow through from the lens only the infrared light with the wavelength of the specific band and visible light;
    a first sensing unit provided with an image pixel for acquiring an image of the object introduced through the infrared transmission filter; and
    a second sensing unit configured to receive the infrared light and the visible light having passed through the infrared transmission filter and measure current illumination, proximity to the object and color temperature of the object, the second sensing unit comprising:
    an illumination detector configured to receive external light having passed through the infrared transmission filter and measure the illumination;
    a proximity detector configured to receive the infrared light having passed through the infrared transmission filter and measure the proximity to the object based on a difference between output voltages according to on/off of the light source unit, the proximity detector comprising an infrared sensor that generates an output voltage in response to infrared light with the wavelength of the specific band that is incident into the proximity detector and a visible light cut-off filter provided on the infrared sensor, and the proximity detector configured to compare an output voltage value from the infrared sensor when the light source unit is in a turned off state with an output voltage value from the infrared sensor when the light source unit is in a turned on state and to detect the proximity to the object based on this comparison; and
    a color temperature detector configured to generate an output voltage based on the visible light and the wavelength of the specific band, which has passed through the infrared transmission filter, and measure the color temperature of the object;
    wherein the second sensing unit is provided separately from the first sensing unit while operating separately from the first sensing unit, and the infrared transmission filter is disposed between the lens and the first and second sensing units.

2. The image sensor according to claim 1, wherein the color temperature detector comprises a red (R) pixel, a green (G) pixel and a blue (B) pixel, and is configured to detect an output voltage based on the visible light and the wavelength of the specific band, which has passed through the infrared transmission filter, and measure the color temperature of the object.

3. The image sensor according to claim 2, wherein the light source unit includes an infrared light emitting diode that irradiates infrared light with a wavelength of 850 nm.

4. The image sensor according to claim 3, wherein the infrared transmission filter is configured to allow the visible light with a wavelength of 400 nm to 650 nm and the infrared light with the wavelength of 850 nm to transmit therethrough.

5. The image sensor according to claim 4, wherein the light source controller is configured to turn on the infrared light emitting diode as a light source when photographing at night if illumination measured by the illumination detector receiving the external light having passed through the infrared transmission filter is equal to or less than a reference value.

6. The image sensor according to claim 4, wherein, when the infrared light emitting diode is used as a light source for proximity determination, the light source controller is configured to turn the infrared light emitting diode on and off a plurality of times for a predetermined time.

7. The image sensor according to claim 6, wherein the light source controller is configured to turn the infrared light emitting diode on and off three to five times, wherein a duration of time the infrared light emitting diode is turned on is 0.1 second or less.

* * * * *